(12) United States Patent
Doyle et al.

(10) Patent No.: US 8,855,404 B2
(45) Date of Patent: Oct. 7, 2014

(54) METHODS AND SYSTEMS FOR INSPECTING A WORKPIECE

(75) Inventors: Joseph D. Doyle, Ladson, SC (US); Paul R. Davies, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 13/594,928

(22) Filed: Aug. 27, 2012

(65) Prior Publication Data

US 2014/0056507 A1 Feb. 27, 2014

(51) Int. Cl.
*G06K 9/00* (2006.01)

(52) U.S. Cl.
USPC ........... 382/152; 382/100; 382/106; 382/153; 382/154; 382/199; 382/216; 348/46; 345/633

(58) Field of Classification Search
CPC .. G06T 7/0042; G01B 11/002; G01B 11/026; G01B 11/25; G01S 17/06
USPC ......... 382/152, 100, 106, 153, 154, 199, 216; 348/46; 345/633
See application file for complete search history.

(56) References Cited

U.S. PATENT DOCUMENTS

| | | | |
|---|---|---|---|
| 4,651,283 A | 3/1987 | Sciaky et al. | |
| 5,175,601 A | 12/1992 | Fitts | |
| 6,856,407 B2 | 2/2005 | Knighton et al. | |
| 7,778,794 B2 | 8/2010 | Davies et al. | |
| 2006/0265177 A1 | 11/2006 | Steinbichler et al. | |
| 2008/0055591 A1 | 3/2008 | Walton | |
| 2009/0198464 A1 | 8/2009 | Clarke et al. | |
| 2013/0016184 A1* | 1/2013 | Gabel et al. | 348/46 |
| 2014/0022281 A1* | 1/2014 | Georgeson et al. | 345/633 |

FOREIGN PATENT DOCUMENTS

EP 0754930 A2 1/1997

OTHER PUBLICATIONS

Extended European Search Report of Application No. 13181494.9; Jan. 9, 2014; 8 pages.

* cited by examiner

*Primary Examiner* — Mike Rahmjoo
(74) *Attorney, Agent, or Firm* — Armstrong Teasdale LLP

(57) ABSTRACT

Methods and systems for inspecting a workpiece are provided. The method includes storing model data associated with the workpiece in an inspection system, determining a relative position of a depth sensing device relative to the workpiece, and calibrating a pose view for the inspection system relative to the model based on the position of the depth sensing device relative to the workpiece. The method further includes measuring actual depth distance data of at least one pixel of the depth sensing device relative to the workpiece and determining, based on the actual depth distance data, if the workpiece satisfies predetermined inspection criteria.

17 Claims, 3 Drawing Sheets

METHODS AND SYSTEMS FOR INSPECTING A WORKPIECE

BACKGROUND

The present disclosure relates generally to non-destructive workpiece inspection and, more particularly, to methods and systems for automated inspection of a workpiece.

Production of a workpiece or assembly may require using multiple parts and tools. It is desirable to perform an accurate and reliable inspection of the assembly during and after construction to ensure production quality by identifying possible issues such as assembly errors, damage of a component in the assembly, and/or foreign object debris (FOD).

At least some known inspections of assemblies are performed manually. In such inspections, inspectors typically use visual and tactile inspections, in combination with personal knowledge, to compare the workpiece against a design model or chart. However, manual inspections generally require inspectors to visually inspect, touch, and feel the workpiece to detect differences between the assembly and the model. As such, manual inspections introduce possibilities of human error. For example, large assemblies such as aircraft, trains, automobile, and ships may include small objects in areas having limited accessibility and thus such areas may be difficult for inspectors to inspect. Moreover, manual inspections may be time-consuming and/or require costly, skilled labor. In some instances, inspectors may use a small optical inspection tool, such as a boroscope or X-ray technology, but such inspection methods still introduce a potential for human error as they require the inspectors to visually recognize differences between the workpiece and the model. Moreover, X-ray technology can only be used on a limited group of materials, as some materials are not visible using X-ray technology.

Other known inspection methods use automated image processing to perform inspections. During inspections, images of a workpiece are captured and analyzed using image processing, such that features within the images are compared to a library of standard features. Features may be identified using border fitting, color matching, and re-sizing of flexible objects. However, such inspection methods may still introduce inaccuracies when identifying small parts, and when inspecting objects of the same color. Moreover, the areas that may be inspected using such technologies may be limited.

BRIEF DESCRIPTION

In one aspect, a method is provided for inspecting a workpiece. The method includes storing model data associated with the workpiece in an inspection system, determining a relative position of a depth sensing device relative to the workpiece, and calibrating a pose view for the inspection system relative to the model based on the position of the depth sensing device relative to the workpiece. The method further includes measuring actual depth distance data of at least one pixel of the depth sensing device relative to the workpiece and determining, based on the actual depth distance data, if the workpiece satisfies predetermined inspection criteria.

In another aspect, a computer system is provided for inspecting a workpiece. The computer system includes a processor, and a computer-readable storage device having encoded thereon computer readable instructions that are executable by the processor to perform functions. The processor performs functions including storing model data associated with the workpiece in the storage device and determining a relative position of a depth sensing device relative to the workpiece. The processor further performs functions including calibrating a pose view for the computer system relative to the model based on the position of the depth sensing device relative to the workpiece. The processor further performs functions including measuring actual depth distance data of at least one pixel of the depth sensing device relative to the workpiece and determining, based on the actual depth distance data, if the workpiece satisfies predetermined inspection criteria.

In yet another aspect, a system is provided for inspecting a workpiece. The system includes a depth sensing device configured to measure actual depth distance data of at least one pixel of the depth sensing device relative to the workpiece. The system also includes a pose detection system configured to determine a relative position of the depth sensing device relative to the workpiece. The system also includes an inspection computer system in communication with the depth sensing device and the pose detection system. The inspection system is programmed to store model data associated with the workpiece and calibrate a pose view for the inspection system relative to the model based on the position of the depth sensing device relative to the workpiece. The inspection system is further programmed to determine, based on the actual depth distance data, if the workpiece satisfies predetermined inspection criteria.

DETAILED DESCRIPTION

Figure 1:
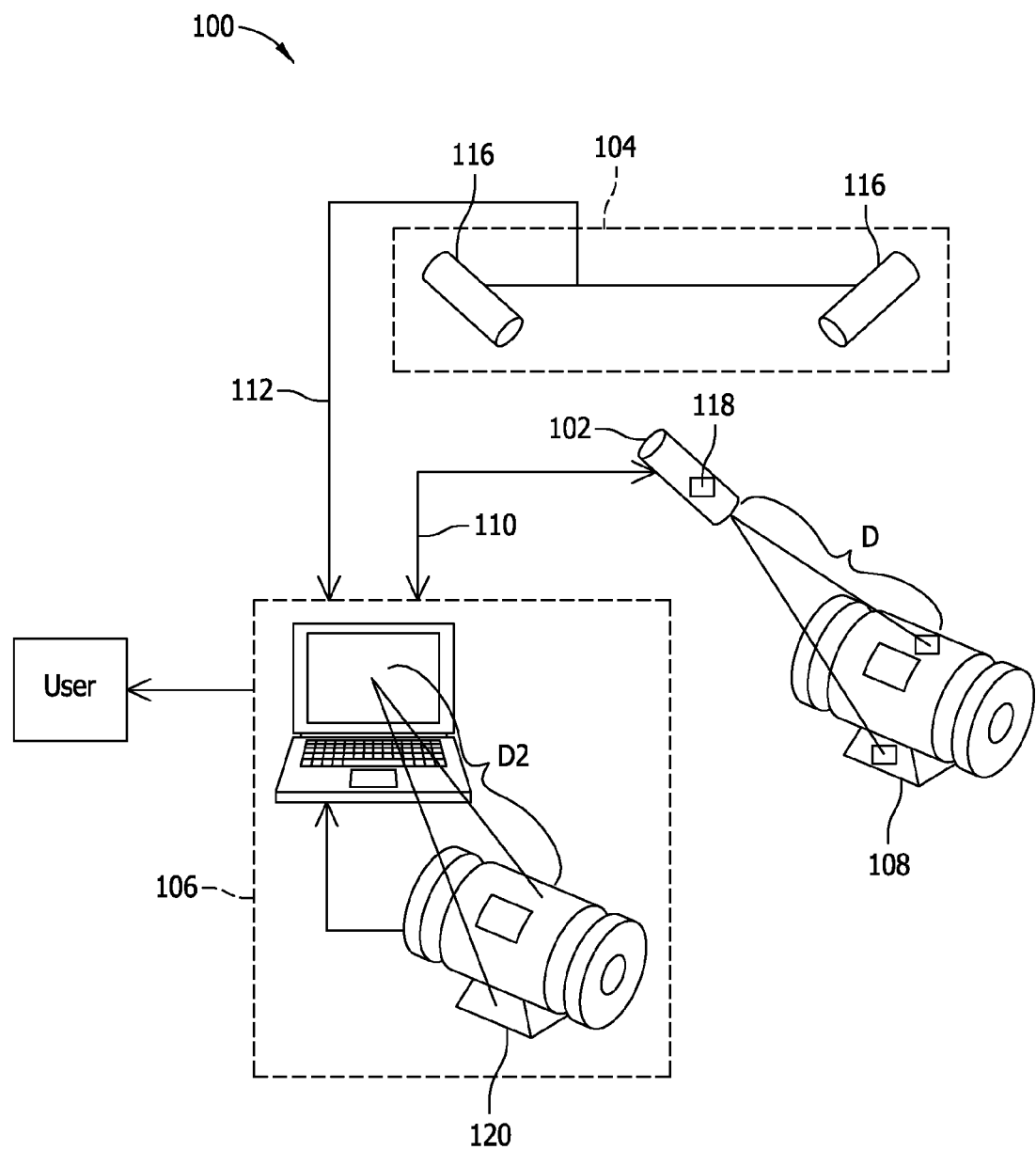
FIG. 1 is a schematic illustration of an exemplary inspection system.

The present disclosure relates generally to workpiece inspection and, more particularly, to methods and systems that enable automated inspection of a workpiece. In one embodiment, an inspection system includes a depth-sensing device that measures actual depth distance data for at least one pixel of the depth sensing device, a position and orientation (pose) detection system that determines pose data of the depth sensing device relative to the workpiece, and an inspection computer system that is coupled to the depth sensing device and to the pose detection system. Embodiments of the methods and systems described herein enable the computing system to (i) store model data associated with the workpiece, (ii) determine a relative position of the depth sensing device relative to the workpiece, (iii) calibrate a pose view for the inspection computer system relative to the model based on the position of the depth sensing device relative to the workpiece, (iv) measure actual depth distance data of at least one pixel of the depth sensing device relative to the workpiece, and (v) determine, based on the actual depth distance data, if a predetermined threshold with respect to the workpiece has been exceeded.

The methods and systems described herein may be implemented using computer programming or engineering techniques including computer software, firmware, hardware or any combination or subset thereof, wherein the technical effects may include at least one of: a) loading model data for the workpiece onto the inspection computer system; b) determining pose data of a depth sensing device relative to the workpiece being inspected; c) calibrating a pose view for the inspection computer system relative to the model and the pose of the depth sensing device relative to the workpiece being inspected; d) measuring actual depth distance data for at least one pixel, wherein the actual depth distance data represents an actual depth distance between the depth sensing device and the workpiece being inspected; e) calculating model depth distance data for the pose view of the inspection computer system, wherein the model depth distance data represents a model depth distance from the pose view of the inspection computer system to the model workpiece; f) comparing the actual depth distance data to the model depth distance data; g) determining whether the actual depth distance differs from the model depth distance and determining whether the difference exceeds a predetermined threshold; and h) displaying a portion of the workpiece that is not present in the model workpiece using an overlay applied to a view of the depth sensing device.

As used herein, an element or step recited in the singular and proceeded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

FIG. 1 is a schematic illustration of an exemplary inspection system 100 that may be used to inspect an assembly or workpiece 108. Generally the workpiece is the product of an engineered environment in which the elements of the structure are assembled in a predefined manner such that the constituent elements are positioned and oriented in a predefined manner with respect to one another and to the workpiece as a whole. Inspection system 100 may be used in a wide variety of applications. For example, inspection system 100 may be used to inspect large assemblies, such as aircraft, trains, ships, or any other large assembly having numerous elements. Alternatively, inspection system 100 may also be used to inspect small assemblies, such as tools or gas/fluid tubes and the like.

As shown in FIG. 1, inspection system 100 includes a depth sensing device 102, a pose detection system 104, and an inspection computer system 106. As used herein, the term "pose" is defined as a position and an orientation of one object relative to another. Inspection system 100 is used to inspect a workpiece, for example, workpiece 108, as described in more detail below, and depth sensing device 102 communicates with inspection computer system 106. Specifically, depth sensing device 102 transmits a signal 110 indicative of a distance D between depth sensing device 102 and workpiece 108 for each pixel in a field of view of depth sensing device 102. Pose detection system 104 communicates with inspection computer system 106 and transmits a signal 112 indicative of a pose of depth sensing device 102 relative to workpiece 108. Alternatively, or in addition, depth sensing device 102 and pose detection system 104 may include a transmitter, a transceiver, and/or any other signal transmission device that enables inspection system 100 to function as described herein.

Depth sensing device 102 may be any suitable depth sensing device or camera capable of measuring an actual distance between depth sensing device 102 and workpiece 108. In some embodiments, depth sensing device 102 is a laser or 3D light depth sensing device. In one embodiment, depth sensing device 102 determines actual distance data by calculating the two-way travel time of a laser beam transmitted towards workpiece 108 and reflected from workpiece 108. In another embodiment, depth sensing device 102 projects an infrared (IR) pattern towards workpiece 108. Depth sensing device 102 includes an infrared camera (not shown) that captures an image of the IR pattern. The depth data is then determined by comparing the expected IR pattern to the actual IR pattern seen by depth sensing device 102. Alternatively, to calculate the distance, depth sensing device 102 may determine a phase difference of the laser beam. Depth sensing device 102 determines the distance based on the travel time or the phase difference using 3D coordinate components (i.e., points on an X, Y, Z axis) in a point cloud where multiple points are grouped.

In the exemplary embodiment, depth sensing device 102 communicates with inspection computer system 106 via a wired connection or via wireless transmissions, and transmits the actual depth distance data to inspection computer system 106. In the exemplary embodiment, depth sensing device 102 includes an image processor that enables a real-time, or substantially real-time, video image of any object within its field of view to be generated. In an alternative embodiment, depth sensing device 102 may capture and store images of any object within its field of view. During use, in the exemplary embodiment, a user manually positions depth sensing device 102 at a desired location relative to workpiece 108. Because depth sensing device 102 generates a video image, the user may move depth sensing device 102 relative to workpiece 108 without causing error or inaccuracy in the inspection. In alternative embodiments, depth sensing device 102 may be positioned using automated controlling devices, or depth sensing device 102 may remain stationary while workpiece 108 is moved relative to depth sensing device 102.

In the exemplary embodiment, pose detection system 104 determines a pose of depth sensing device 102 relative to workpiece 108. More specifically, in the exemplary embodiment, pose detection system 104 includes a processor that enables pose detection system 104 to determine pose of depth sensing device 102 in real-time, or near real-time. Pose detection system 104 communicates with inspection computer system 106 via a wired connection or via wireless transmissions.

Pose detection system 104 may determine the pose of depth sensing device 102 using different methods. In the exemplary embodiment, pose detection system 104 is a motion capture system that includes a plurality of cameras 116 positioned about workpiece 108. A plurality of small reflective markers 118 are coupled to each object being tracked (i.e., to depth sensing device 102 and to workpiece 108). Such markers 118 facilitate the calibration of the pose of depth sensing device 102 relative to workpiece 108. Cameras 116 emit a near infra-red light about workpiece 108, which is reflected back from markers 118. In the exemplary embodiment, workpiece 108 remains stationary during the inspection process and is calibrated at an origin (0, 0, 0) with respect to the coordinate system because workpiece 108 remains stationary during the inspection process. When multiple cameras 116 observe a reflective marker 118, pose detection system 104 can determine, i.e., essentially triangulate, a position of that marker 118 in 3D space. Moreover, when multiple markers 118 are attached to the same object, pose detection system 104 can also determine a relative orientation of that object. Other systems and methods of determining the pose of depth sensing device 102 may include, but are not limited to, marker-based tracking, two-dimensional (2D) planar-natural feature tracking, 3D model-based tracking, 3D depth-sensor training, 3D tracking using an iterative closest point, mechanical tracking devices that physically connect depth sensing device 102 to a reference location (i.e., the marker on workpiece 108), magnetic-tracking devices that determine a strength and location of a pulsed magnetic field, sourceless non-inertial tracking devices that use passive magnetic sensors referenced to the earth's magnetic field, optical tracking devices, acoustic tracking devices, and/or any other tracking device, combination of devices, or method that enables the pose to be determined.

Figure 2:
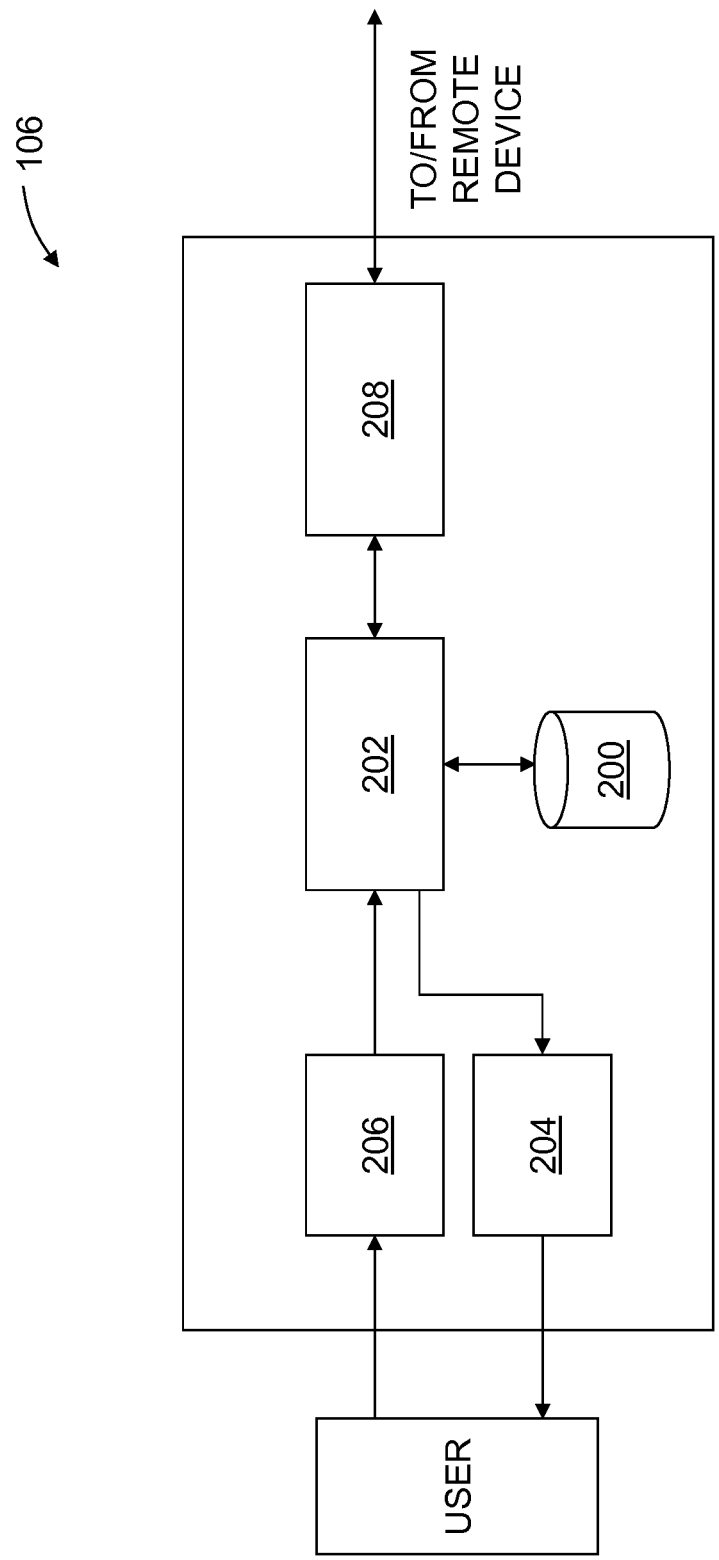
FIG. 2 is a schematic illustration of an exemplary inspection computer system that may be used with the inspection system shown in FIG. 1.

FIG. 2 is a schematic illustration of an exemplary inspection computer system 106 (shown in FIG. 1) that may be used with the inspection system 100 (shown in FIG. 1). In the exemplary embodiment, inspection computer system 106 includes a memory device 200, and a processor 202 coupled to memory device 200 for use in executing instructions. More specifically, in the exemplary embodiment, inspection computer system 106 is configurable to perform one or more operations described herein by programming memory device 200 and/or processor 202. For example, processor 202 may be programmed by encoding an operation as one or more executable instructions and by providing the executable instructions in memory device 200.

Processor 202 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits. In the exemplary embodiment, processor 202 is configured to load model workpiece 120 (shown in FIG. 1) data for workpiece 108 (shown in FIG. 1), receive pose data from pose detection system 104 (shown in FIG. 1), calibrate a pose view for inspection computer system 106 relative to the model and the pose of depth sensing device 102 (shown in FIG. 1) relative to workpiece 108, receive the actual depth distance data from depth sensing device 102, calculate model workpiece 120 depth distance data for the pose view of inspection computer system 106, wherein the model depth distance data represents a model depth distance from the pose view of inspection computer system 106 to model workpiece 120, and compare the actual depth distance data to the model depth distance data.

In the exemplary embodiment, memory device 200 includes one or more devices (not shown) that enable information such as executable instructions and/or other data to be selectively stored and retrieved. In the exemplary embodiment, such data may include, but is not limited to, pose data, positional data, directional data, previously scanned model workpiece 120 data, computer aided design (CAD) model data, GPS data, map data, blueprint data, floor plan data, operational data, inspection threshold data, and/or control algorithms. Alternatively, inspection computer system 106 may be configured to use any algorithm and/or method that enable the methods and systems to function as described herein. Memory device 200 may also include one or more computer readable media, such as, without limitation, dynamic random access memory (DRAM), static random access memory (SRAM), a solid state disk, and/or a hard disk. In the exemplary embodiment, memory device 200 stores data related to the inspection process, for example, previously scanned model workpiece 120 data, CAD model data of workpiece 108 and/or inspection threshold data. Point clouds detected by depth sensing device 102 may also be saved on memory device 200 and used as documentation of a built condition or a verified inspection of workpiece 108.

In the exemplary embodiment, inspection computer system 106 includes a presentation interface 204 that is coupled to processor 202 for use in presenting information to a user. For example, presentation interface 204 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 204 includes one or more display devices. In the exemplary embodiment, processor 202 is configured to compare a distance D (shown in FIG. 1) measured by depth sensing device 102 to a distance D2 (shown in FIG. 1) calculated for model workpiece 120 by inspection computer system 106. If there is a difference, processor 202 compares the difference to predetermined threshold data stored on memory device 200. In the exemplary embodiment, when a difference of distances D and D2 exceeds the predetermined threshold, processor 202 displays to a user a portion of workpiece 108 that is not present in model workpiece 120 using presentation interface 204. The overlay may be displayed using different methods. In one embodiment, only that portion of workpiece 108 exceeding the predetermined threshold is displayed. In another embodiment, all of workpiece 108 is displayed, and the non-compliant portions of workpiece 108 are displayed in a different color than the remainder of workpiece 108. Alternatively, any other method of display may be used that enables displaying selected areas of a workpiece determined to have portions that predetermined tolerances.

Inspection computer system 106, in the exemplary embodiment, includes an input interface 206 for receiving input from the user. For example, in the exemplary embodiment, input interface 206 receives information suitable for use with any of the methods described herein. Input interface 206 is coupled to processor 202 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 204 and as input interface 206.

In the exemplary embodiment, inspection computer system 106 includes a communication interface 208 that is coupled to processor 202. In the exemplary embodiment, communication interface 208 communicates with at least one remote device, such as depth sensing device 102 and/or pose detection system 104. For example, communication interface 208 may use, without limitation, a wired network adapter, a wireless network adapter, and/or a mobile telecommunications adapter. A network (not shown) used to couple inspection computer system 106 to the remote device may include, without limitation, the Internet, a local area network (LAN), a wide area network (WAN), a wireless LAN (WLAN), a mesh network, and/or a virtual private network (VPN) or other suitable communication means.

Figure 3:
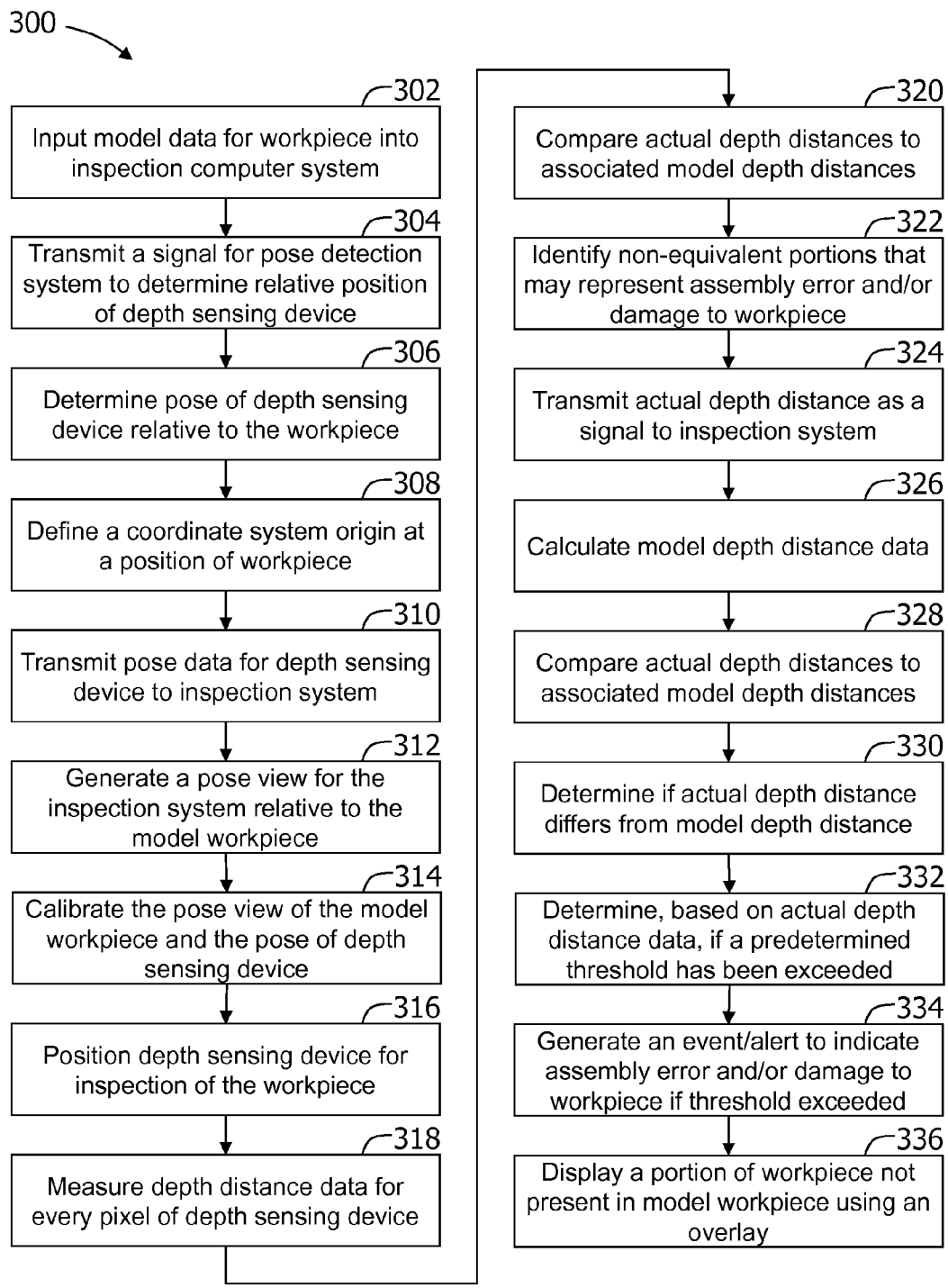
FIG. 3 is a flowchart of an exemplary method that may be implemented by the inspection system shown in FIG. 1.

FIG. 3 is a flowchart of an exemplary method 300 that may be implemented to inspect a workpiece, such as workpiece 108 (shown in FIG. 1) using an inspection system, such as inspection system 100 (shown in FIG. 1). During operation, in the exemplary embodiment, inspection system 100 is operated by a user using inspection computer system 106 (shown in FIG. 1). Input interface 206 (shown in FIG. 2) enables the user to input 302 model workpiece 120 data associated with workpiece 108 into inspection computer system 106. In one embodiment, the model data is 3D CAD model data that is stored in memory device 200 (shown in FIG. 2).

After inputting 302 the model data, inspection computer system 106 transmits 304 a signal 112 (shown in FIG. 1) requesting pose detection system 104 (shown in FIG. 1) to determine 306 a pose of depth sensing device 102 (shown in FIG. 1) relative to workpiece 108.

To determine 306 the pose of depth sensing device 102, in the exemplary embodiment, the user defines 308 a 3D coordinate system origin at a position of workpiece 108. Pose detection system 104 determines 306 a pose of depth sensing device 102 relative to workpiece 108 using a plurality of position-detecting cameras, such as cameras 116 (shown in FIG. 1). Pose detection system 104 transmits 310 the pose data back to inspection computer system 106 as signal 112.

Using the pose data of depth sensing device 102 and the model data for workpiece 108 stored in memory device 200, inspection computer system 106 generates 312 a pose view for inspection computer system 106 relative to the model workpiece. Inspection computer system 106 calibrates 314 the pose view of model workpiece 120 and the pose of depth sensing device 102, enabling the pose view of model workpiece 120 to be displayed by inspection computer system 106 such that it remains in sync with a view of depth sensing device 102 relative to workpiece 108 as depth sensing device 102 is repositioned about workpiece 108.

The user positions 316 depth sensing device 102 for inspection of a desired portion of workpiece 108. In the exemplary embodiment, depth sensing device 102 is positioned 316 manually by the user. In alternative embodiments, depth sensing device 102 may be positioned 316 by an automated positioning system or it may remain stationary while workpiece 108 is moved for inspection.

After calibration 314 and positioning 316, depth sensing device 102 measures 318 depth distance data to determine an actual depth distance between depth sensing device 102 and workpiece 108 for each pixel of depth sensing device 102. In one embodiment, the user may continuously move or sweep depth sensing device 102 about workpiece 108 to capture a plurality of actual depth distances and to enable comparisons 320 to a plurality of associated model depth distances to identify 322 non-equivalent portions that may represent assembly error and/or damage to workpiece 108. Depth sensing device 102 transmits 324 the actual depth distance data as a signal 110 (shown in FIG. 1) to inspection computer system 106.

Inspection computer system 106 then calculates 326 model workpiece 120 depth distance data representing a model depth distance between the pose view generated 312 by inspection computer system 106 and model workpiece 120. Inspection computer system 106 compares 328 the actual depth distance data to the model depth distance data to determine 330 whether the actual depth distance differs from the model depth distance. If the actual depth distance differs from the model depth distance, inspection computer system 106 determines 332 whether the difference exceeds predetermined thresholds. Compliance with the thresholds is an indication that workpiece 108 is in acceptable condition. If the thresholds are exceeded, inspection computer system 106 generates 334 an alert or event to indicate a potential assembly error, existence of foreign object debris, and/or damage to workpiece 108. Moreover, inspection computer system 106 displays 336 a portion of workpiece 108 that is not present in model workpiece 120 using an overlay applied to a view of depth sensing device 102.

The embodiments described herein relate generally to workpiece inspection and, more particularly, to methods and systems for automated inspection of a workpiece. The embodiments described herein coordinate accurate and reliable systems and methods for workpiece inspection. More specifically, the embodiments described herein provide an automated method that facilitates reducing the human error component during workpiece inspection. A depth sensing device measures a distance for each pixel in its field of view and transmits the distance data to an inspection computer system. A pose detection system tracks the position and orientation of the depth sensing device with respect to the workpiece and transmits the positioning to the inspection computer system. Using a model of the workpiece stored on the inspection computer system, the system generates a model view of the model workpiece, wherein the model view tracks the actual view seen by the depth sensing device in real-time or near real-time. The inspection computer system then compares the actual distance seen by the depth sensing device with the model distance calculated on the inspection computer system, and creates an alert if the difference in distances exceeds a predetermined threshold. The inspection computer system may also generate a display to illustrate to a user which section of the workpiece caused the alert. Human error is substantially reduced by the embodiments described herein. Moreover, the inspection system enables measurement of both large and small workpieces, as well as a workpiece with limited physical accessibility. The embodiments described herein also facilitate reducing inspection times of costly manual inspections.

Exemplary embodiments of methods and systems for workpiece inspection systems are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for inspecting a workpiece, said method comprising:

storing model data associated with the workpiece in an inspection system;

determining a relative position of a depth sensing device relative to the workpiece;

calibrating a pose view for the inspection system relative to the model based on the position of the depth sensing device relative to the workpiece;

measuring actual depth distance data of at least one pixel of the depth sensing device relative to the workpiece; and determining, based on the actual depth distance data, if the workpiece satisfies predetermined inspection criteria, wherein determining if the workpiece satisfies predetermined inspection criteria comprises:

calculating model depth distance data for the pose view of the inspection system, wherein model depth distance data represents a model depth distance from the pose view of the inspection system to the model workpiece;

determining whether the actual depth distance differs from the model depth distance; and determining whether the difference satisfies the inspection criteria when the actual depth distance differs from the model depth distance, wherein compliance with a threshold indicates the workpiece is in acceptable condition.

2. A method in accordance with claim 1, wherein storing the model data comprises storing computer aided design model data associated with the workpiece.

3. A method in accordance with claim 1, wherein storing the model data comprises storing a previously scanned model of the workpiece.

4. A method in accordance with claim 1, wherein determining the relative position of the depth sensing device comprises:
defining a coordinate system origin at a designated position of the workpiece; and
determining a location of the depth sensing device relative to the workpiece using a plurality of position-detecting cameras.

5. A method in accordance with claim 1, further comprising transmitting the location of the depth sensing device to the inspection system.

6. A method in accordance with claim 1, wherein measuring actual depth distance includes moving the depth sensing device about the workpiece to capture a plurality of actual depth distances, said method further comprising:
comparing the plurality of actual depth distances to a plurality of associated model depth distances to identify non-equivalent portions.

7. A method in accordance with claim 1, further comprising displaying a portion of the workpiece that is not present in the model workpiece using an overlay applied to a view of the depth sensing device.

8. A method in accordance with claim 7, wherein the overlay is configured to illustrate a presence of at least one of foreign object debris, a missing component, an assembly error, and a damaged component.

9. A method in accordance with claim 1, wherein measuring the actual depth distance data further comprises generating a three-dimensional point cloud.

10. A computer system for inspecting a workpiece, said computer system comprising:
a processor; and
a computer-readable storage device having encoded thereon computer readable instructions that are executable by the processor to perform functions comprising:
storing model data associated with the workpiece in the storage device;
determining a relative position of a depth sensing device relative to the workpiece;
calibrating a pose view for the computer system relative to the model based on the position of the depth sensing device relative to the workpiece;
measuring actual depth distance data of at least one pixel of the depth sensing device relative to the workpiece; and
determining, based on the actual depth distance data, if the workpiece satisfies predetermined inspection criteria, wherein determining if the workpiece satisfies predetermined inspection criteria further comprises:
calculating model depth distance data for the pose view of the computer system, wherein the model depth distance data represents a model depth distance from the pose view of the computer system to the model workpiece;
determining whether the actual depth distance differs from the model depth distance; and
determining whether the difference satisfies the inspection criteria when the actual depth distance differs from the model depth distance, wherein compliance with a threshold indicates the workpiece is in acceptable condition.

11. A computer system in accordance with claim 10, wherein storing model data, the functions performed by the processor further comprise storing at least one of computer aided design model data associated with the workpiece and a previously scanned model of the workpiece.

12. A computer system in accordance with claim 10, wherein the functions performed by the processor further comprise displaying a portion of the workpiece that is not present in the model workpiece using an overlay applied to a view of the depth sensing device.

13. A system for inspecting a workpiece, said system comprising:
a depth sensing device configured to measure actual depth distance data of at least one pixel of the depth sensing device relative to the workpiece;
a pose detection system configured to determine a relative position of the depth sensing device relative to the workpiece; and
an inspection computer system in communication with the depth sensing device and the pose detection system, the inspection computer system programmed to:
store model data associated with the workpiece;
calibrate a pose view for the inspection computer system relative to the model based on the position of the depth sensing device relative to the workpiece; and
determine, based on the actual depth distance data, if the workpiece satisfies predetermined inspection criteria, wherein the inspection computer system is programmed to determine if the workpiece satisfies predetermined inspection criteria by being programmed to:
calculate model depth distance data for the pose view of the inspection computer system, wherein the model depth distance data represents a model depth distance from the pose view of the inspection computer system to the model workpiece;
determine whether the actual depth distance differs from the model depth distance; and
determine whether the difference satisfies the inspection criteria when the actual depth distance differs from the model depth distance, wherein compliance with a threshold indicates the workpiece is in acceptable condition.

14. A system in accordance with claim 13, wherein to store model data, the inspection computer system is further programmed to store computer aided design model data associated with the workpiece.

15. A system in accordance with claim 13, wherein to store model data, the inspection computer system is further programmed to store a previously scanned model of the workpiece.

16. A system in accordance with claim 13, wherein the overlay is displayed in one of real-time and near real-time.

17. A system in accordance with claim 13, wherein the inspection computer system is configured to display a portion of the workpiece that is not present in the model workpiece using an overlay applied to a view of the depth sensing device.

* * * * *